Figure 1:
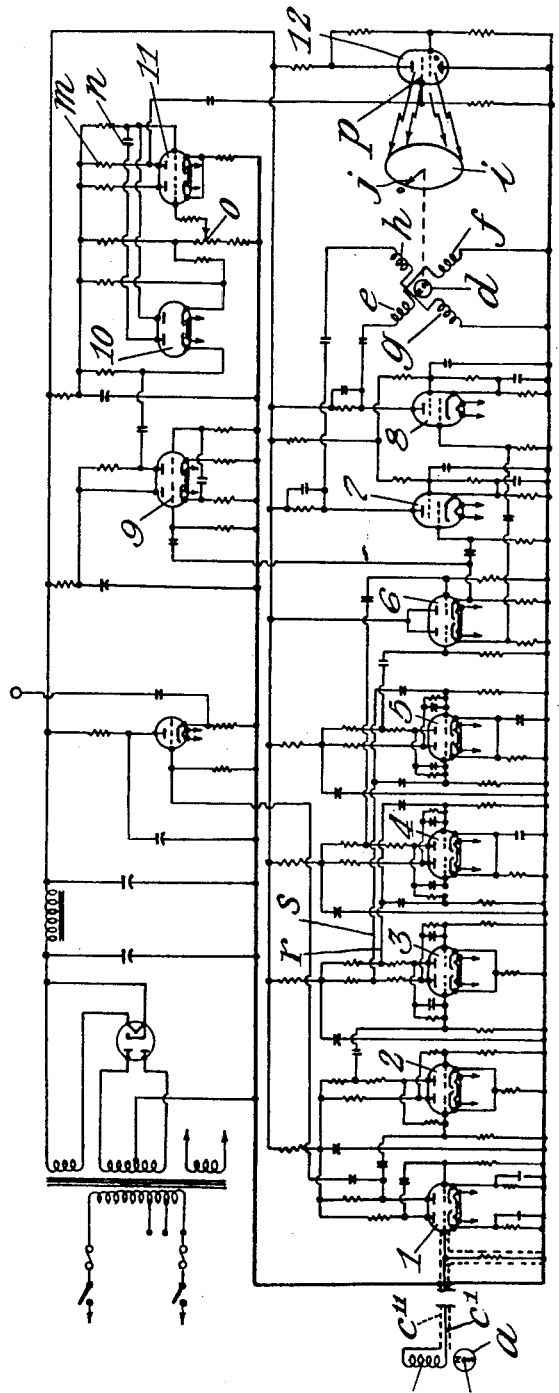

July 10, 1956

A. C. SWANNELL 2,754,479

SPEED MEASURING DEVICES

Filed Dec. 15, 1952

2 Sheets-Sheet 1

Inventor:
Alexander Charles Swannell
by
Attorney

United States Patent Office 2,754,479
Patented July 10, 1956

2,754,479

SPEED MEASURING DEVICES

Alexander Charles Swannell, London, England, assignor of one-half to The Submerged Log Company Limited, London, England Application December 15, 1952, Serial No. 325,924

Claims priority, application Great Britain December 20, 1951

5 Claims. (Cl. 324—70)

This invention relates to methods of and means for measuring the number of revolutions or vibrations and/or the instantaneous speed of a rotating or vibrating body and is particularly, though not exclusively, applicable to ships' logs.

The invention consists in a method of and means for obtaining 90° phase displaced impulses from 180° phase displaced impulses without the need for inductances.

The invention also consists in a method of and means for timing the movement of a pick-up element e. g. an impeller, from which impulses are caused to drive a synchronous motor according to which the supply to the said motor is used as a "switch" to initiate a timing period at a given point in the movement of the pick-up element.

The invention also consists in a method of and means for obtaining 90° phase displaced impulses from 180° phase displaced impulses according to which each of the two signals is applied to both grids of one of two double-triode frequency divider tubes connected as multi vibrators and an output is taken from one only of the anode circuits of each tube.

By this means signals spaced apart by 90° and at half the frequency of the applied signals can be obtained without the use of inductive elements; the arrangement will operate with D. C. signals and the degree of phase shift for a very wide frequency range is constant.

The invention also consists in a method as set forth in the first of the two preceding paragraphs wherein the output signals are fed to a cathode-follower buffer tube and the anode load resistors in the frequency-dividing circuits are such that the current drawn in triggering does not disturb stable operation of the other dividing elements.

The invention also consists in a method of measuring the speed of a rotating member, e. g. a ship's log impeller wherein a polyphase A. C., obtained directly or indirectly from the rotation of said rotating member, is used to drive a polyphase synchronous motor coupled to a driven member, e. g. a slotted disc associated with a fixed scale and wherein a flash-tube is adapted to operate at moments delayed by a predetermined fixed timing period initiated by a pulse derived from one of the motor phases, so that the driven member, when illuminated, indicates in correlation with the scale, the actual speed of the rotating member.

The invention also consists in means for measuring the speed of a rotating member in accordance with the method set forth in the preceding paragraph wherein said driven member comprises a disc furnished with a radial slot that operates in the manner of an illuminated pointer.

The invention also consists in methods of and means for measuring the speed of rotating or vibrating members substantially as hereinafter described with reference to the accompanying drawings.

Figure 2:
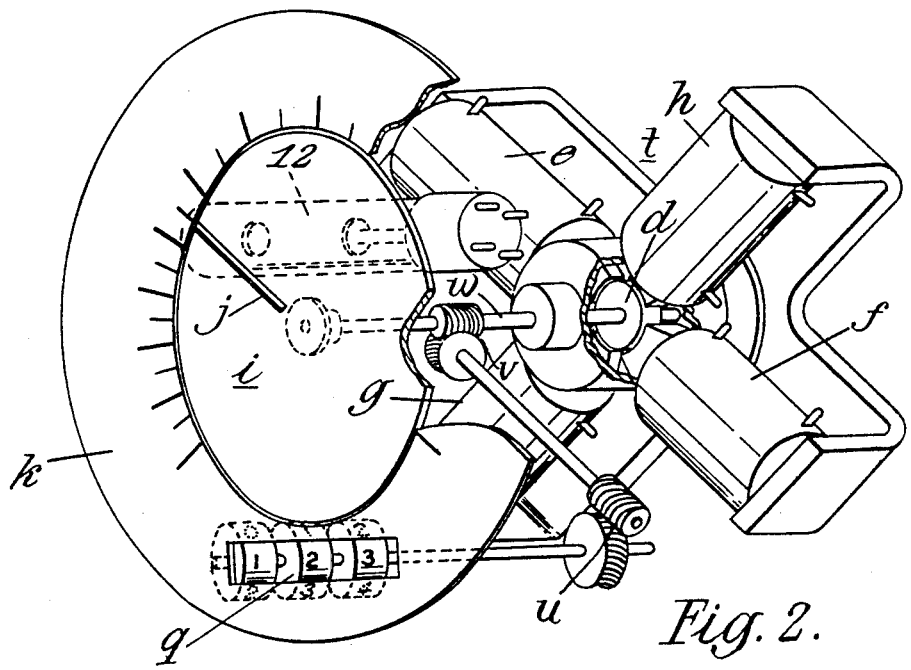

Referring to the accompanying drawings:

Figure 1 is a diagram illustrating one convenient arrangement embodying the present invention, and Figure 2 is a diagrammatic view of a detail thereof.

In carrying the invention into effect according to one convenient form illustrated by way of example in Figures 1 and 2 as applied to the measurement of the prevailing speed of a ship's log impeller, we mount a two-pole magent $a$ in disc form on the impeller shaft $b$ and at a fixed distance of, say $\frac{1}{4}''$ from the rotating magnet we provide a small coil $c$ with a laminated core completely sealed from water penetration. As the magnet poles pass across the end of this coil, impulses are generated in direct proportion to the speed of the impeller.

The single phase alternator current thus generated is fed by way of a lead $c'$ with outer earthed screen $c''$ to one grid of a double-triode pre-amplifier double triode tube 1. The output from this tube is connected to the grid of a trigger-forming circuit comprising a further double-triode tube 2.

The output obtained from tube 2 is fed into a 2:1 frequency divider tube 3. This tube is connected as a multivibrator, or "scale-of-two" circuit, the important feautre of this circuit being that its elements are locked in one, of two, stable conditions, one section conducting and the opposite section not conducting. When a negative pulse or trigger is applied to its grids, this conducting-non-conduction condition is reversed between sections.

Thus, for each trigger received from tube 2, an output rectangular waveform is obtained from the anodes of tube 3, the output from the respective anodes being opposite in sense, i. e., phase displaced by 180°.

The purpose of tubes 4 and 5 is to shift the 180° phases to 90°. The tubes 4 and 5 are similar to the valve 3 except that only one output per tube is taken.

The operation is as follows: Trigger lines $r$ and $s$ are connected from the anodes of tube 3 to the tubes 4 and 5. As each tube divides by two and as each is triggered alternately, the result is two waveforms 90° displaced from each other.

The outputs from the midpoints of the resistors in an anode of each of these two multivibrators 4, 5, are taken respectively to the grids of a further double-triode valve 6 connected as a cathode-follower buffer stage and the respective cathodes of the buffer-stage valve are connected over power tetrodes 7, 8 to the respective phase windings of a two-phase synchronous motor $t$.

In order to eliminate interaction between the section comprising tubes 4, 5 and 6 (the phase splitting circuit) and the section comprising tubes 7 and 8 (power amplifiers), a cathode follower, buffer stage is connected into the phase shifting network output.

Similarly connections are taken from intermediate points on the anode load resistors in the frequency dividing circuits to reduce current drawn in triggering subsequent stages so as not to affect stable operation of the other dividing element.

The two two-phase 90° output signals from the tube 6 are amplified, converted from rectangular waveform into a flat-top triangular form in two inductive motor load coils, this effect being obtained by the use of a capacitative coupling across the anode load resistors.

Although almost any 90° two-phase instrument motor, of correct voltage rating, may be used as a synchronous output motor, it is preferred that a motor be employed comprising a rotor in the form of a disc permanent magnet $d$ with stator or field coils $e$, $f$, $g$, $h$, arranged in pairs $ef$ and $gh$, at 90° to each other; opposite coils in each pair are connected in series and in the same sense.

The rotor $d$ will complete one revolution for two revolutions of the initial pick-up shaft $b$, that is, if a two-pole pick-up magnet is used as shown. One-to-one ratio may be obtained by the employment of a four-pole, two-field magnet in the pick-up. The direction of output motor rotation is determined by appropriate phase connection as shown.

By coupling the rotor $d$ of the output motor into suitable ratio gearing, a total revolution counter or register may be employed to record the revolutions or cycles of the pick-up element if desired.

The rotor $d$ will take up a predetermined position within the stator field and its angular relation to each of the motor supply phases is known. Any one phase therefore forms an instantaneous index to the position of the moving rotor $a$.

One motor supply phase is taken, and fed into a timing or delay circuit comprising tubes 9, 10 and 11, the output of which is used to trigger a flash tube 12 illuminating a disc connected to the motor shaft. The disc is furnished with a radial slot $j$ that is rendered visible by the flash tube 12 and appears to be stationary owing to the very short period of illumination. The delay period being constant and the motor shaft velocity variable, the angular displacement of the slot between a motor phase and the illuminating flash is an accurate indication of the instantaneous speed and therefore of the initial frequency of the impeller and rotor $a$. This method of timing the movement of the impeller (and thus the input frequency) using the supply to the synchronous motor as a "switch" to initiate the timing period at a given point in the rotation of the rotor, constitutes a further feature of the present invention.

The disc $i$ is encircled by a fixed dial or scale $k$ illuminated from the rear by the flash tube 12. The slot $j$ in the disc $i$ is set in line with a zero mark on the scale $k$ corresponding to the position when the field of the rotor $d$ is in line with one of the stator coils, the operating phase of which is used as a trigger for the timing circuit.

The synchronous motor requires four cycles, two cycles on each of its two phases, to complete one revolution; therefore, one cycle of one phase is equal to 180° of motor rotation. The input to the power amplifier tube 7 is of rectangular waveform and it is from this point in the circuit that the timing trigger is taken. The rectangular waveform is fed into a trigger-forming circuit 9 and converted into a pulse and injected into tubes 10 and 11, only the first part of the motor phase being used in forming the trigger.

Tubes 10 and 11 are connected as a "Monostable-Multivibrator."

By arrangement of the resistive and capacitive elements $m$ and $n$ in the second anode circuit of tube 11, and adjustment of the voltage on the opposite grid by potentiometer $o$, a definite width of rectangular waveform is generated at the second anode of tube 11.

From the duration of the second anode waveform, a positive pulse is obtained and applied as a trigger to the grid $p$ of the flash tube 12.

For convenient operation, a cold cathode tetrode, gas tube may be used if desired for flash illumination.

Adjustment of the potentiometer $o$ will change the timing period, thus providing means of calibration of the speed indicator.

In addition to its use as a ship's log indicating the ship's instantaneous speed through the water, a tachometer $q$ is provided, driven by gearing $rs$ from the shaft $t$ so as to record also the total revolutions.

Instead of employing a magnetic pick-up coupled direct to the moving shaft $b$, a remote pick-up can be used, in which a vane or slotted disc, attached to the shaft to be measured, being allowed to interrupt a beam of light directed into a light sensitive cell.

Advantage may be made of this form of input in that the initial frequency can be multiplied conveniently by allowing a suitable number of slots in the interrupter to pass between the light source and the cell. Therefore speeds as low as one or two revolutions per minute may be accurately recorded and/or indicated.

Very high input frequencies can on the other hand be measured by arranging for only one pulse per revolution and connecting frequency dividing circuits between the pre-amplifier and phase shifting stages.

I claim:

1. In a stroboscopic device for indicating the frequency of a pick-up element, a polyphase synchronous motor, a circuit in which single phase impules from said pick-up element are changed to polyphase impulses fed to said motor to cause it to operate at a speed proportional to the frequency of said pick-up element, an indicator member driven by said motor, a fixed scale adjacent to said indicator member, a flash-tube adapted to operate to illuminate said indicator member and associated scale after a predetermined fixed time period following the transmission thereto of an impulse derived from one of the motor phases.

2. In a stroboscopic device for indicating the speed of a rotating pick-up element, a polyphase synchronous motor, a circuit in which single phase impulses from said pick-up element are changed to polyphase impulses fed to said motor to cause it to operate at a speed proportional to that of said rotating pick-up element, an indicator member driven by said motor, a fixed scale adjacent to said indicator member, a flash-tube adapted to operate to illuminate said indicator member and associated scale after a predetermined fixed time period following the transmission thereto of an impulse derived from one of the motor phases.

3. In a stroboscopic device as defined in claim 2 the further improvement of said circuit including means to obtain 180° phase displaced impulses from said single phase impulse, and means to obtain 90° phase displaced impulses from said 180° phase displaced impulses including two double-triode frequency divider tubes connected as multi-vibrators wherein one of the 180° phase displaced signals is applied to both grids of one of said tubes, the other of said signals is applied to both grids of the other of said tubes, and an output is taken from only one of the anode circuits of each tube.

4. In a stroboscopic device as defined in claim 3 the further improvement of said circuit including a cathode-follower buffer tube arranged to receive the output signals from said frequency divider tubes.

5. In a stroboscopic device for indicating the speed of a rotating member such as a ship's log impeller, a pick-up element adapted to rotate with said member and generate single phase impulses, a two phase synchronous motor, a circuit in which said single phase impulses from said pick-up element are changed to two phase impulses characterized by a 90° phase displacement and said two phase impulses are fed to said motor to cause it to operate at a speed proportional to that of said rotating pick-up element, an indicator member driven by said motor, a fixed scale adjacent to said indicator member, a flash-tube adapted to operate to illuminate said indicator member and associated scale after a predetermined fixed time period following the transmission thereto of an impulse derived from one of the motor phases.

References Cited in the file of this patent

UNITED STATES PATENTS 2,604,520  Andresen _____ July 22, 1952